United States Patent [19]

Kunihiko et al.

[11] Patent Number: 4,521,265

[45] Date of Patent: Jun. 4, 1985

[54] PROCESS FOR PREPARING LAMINATED PLATE

[75] Inventors: Ichikawa Kunihiko, Machida; Mishima Kiyoshi, Hachioji, both of Japan

[73] Assignee: Mitsubishi Light Metal Industries Limited, Tokyo, Japan

[21] Appl. No.: 530,597

[22] PCT Filed: Nov. 20, 1981

[86] PCT No.: PCT/JP81/00352

§ 371 Date: Jul. 20, 1983

§ 102(e) Date: Jul. 20, 1983

[87] PCT Pub. No.: WO83/01756

PCT Pub. Date: May 26, 1983

[51] Int. Cl.$^3$ .............................................. B32B 31/22
[52] U.S. Cl. ................................. 156/229; 156/243; 156/244.11; 156/244.23; 156/244.24; 156/244.27; 156/322; 156/324
[58] Field of Search ............... 156/244.11, 244.23, 156/244.24, 244.27, 196, 199, 205, 206, 229, 243, 322, 324, 221, 494, 160; 264/285, 288.4, 290.2

[56] References Cited

U.S. PATENT DOCUMENTS

| | | | |
|---|---|---|---|
| 3,408,240 | 10/1968 | Williams | 156/324 |
| 3,684,610 | 8/1972 | Frielingsdorf et al. | 156/244.27 |
| 3,940,216 | 2/1976 | Hinckley | 156/229 |

FOREIGN PATENT DOCUMENTS

| | | | |
|---|---|---|---|
| 989717 | 5/1976 | Canada | 156/244.23 |
| 16549 | 4/1974 | Japan . | |
| 23705 | 8/1975 | Japan . | |
| 42071 | 11/1978 | Japan . | |
| 39462 | 10/1980 | Japan . | |

*Primary Examiner*—Caleb Weston
*Attorney, Agent, or Firm*—Oblon, Fisher, Spivak, McClelland & Maier

[57] ABSTRACT

Preheated metallic sheets are laminated on both surfaces of a molten thermoplastic synthetic resin sheet to form a laminated plate and the laminated plate is treated by a desired process to form curves of the laminated plate in a degree less than its bending elastic limit to prepare a laminated plate having excellent appearance without any longitudinal wave on the metallic sheet surfaces.

6 Claims, 4 Drawing Figures

PROCESS FOR PREPARING LAMINATED PLATE

BACKGROUND OF THE INVENTION

1. Field of the Invention

The present invention relates to a process for preparing a laminated plate. More particularly, it relates to a process for preparing a laminated plate by laminating metallic sheets on both surfaces of a thermoplastic synthetic resin.

2. Description of the Prior Art

A laminated plate prepared by laminating metallic sheets on both surfaces of a thermoplastic synthetic resin sheet has been well-known in, for example U.S. Pat. No. 3,382,136 and has been used in various usages as a laminated product having both characteristics of a metal and a thermoplastic synthetic resin (hereinafter referring to as a synthetic resin). Such laminated plate has been continuously prepared by processes including the following steps disclosed in U.S. Pat. No. 3,616,019. That is, the process includes (a) a heating step of heating two sheets of metallic sheets stretched under a constant tension; (b) a laminating step of forming a laminating plate by feeding preheated metallic sheets and a molten synthetic resin sheet between heat-press rolls to place the synthetic resin sheet between the metallic sheets; and (c) a cooling step of cooling the resulting laminated plate.

Thus, one disadvantage of the process is to form creases and waves on the metallic sheet surface of the laminated plate. Such disadvantage of the metallic sheet surface causes inferior appearance in the case of the use of the laminated plate, for example, as a board of a furniture. When the metallic sheet is thinner or the synthetic resin sheet is thicker, the formation of creases or waves is more significant.

Thus, the formation of creases on the metallic sheet surface has been overcome by certain methods. Transverse wave formed on the metallic sheet surface in the direction perpendicular to the stretching direction of the laminated plate has been also overcome. However, any effective process for overcoming longitudinal wave formed on the metallic sheet in the stretching direction of the laminated plate has not been found.

An object of the present invention is to provide a laminated plate having no longitudinal wave on the metallic sheet surface. The object has been easily attained by the process of the present invention.

SUMMARY OF THE INVENTION

The present invention provides a process for preparing a laminated plate by laminating metallic sheets on both surfaces of a thermoplastic synthetic resin sheet, and is to provide a process for preparing a laminated plate which comprises (a) preheating two metallic sheets stretched under a constant tension;

(b) forming a laminated plate by feeding the preheated metallic sheets and a molten synthetic resin sheet between heat-press rolls to place the synthetic resin sheet between the metallic sheets;

(c) passing the laminated plate among a plurality of rolls placed in zig-zag positions to form curves of the laminated plate in a degree less than its bending elastic limit; and (d) cooling the laminated plate to reduce the temperature of the synthetic resin to the softening point or lower on the rolls in the bending step.

DETAILED DESCRIPTION OF THE PREFERRED EMBODIMENTS

The metallic sheets (1), (1') and a synthetic resin sheet (2) used in the process of the present invention will now be illustrated.

The metallic sheets (1), (1') can be sheets made of aluminum, steel, stainless steel, iron, copper, tin or nickel or an alloy thereof. A thickness of the metallic sheet (1), (1') is 0.5 mm or less and usually in a range of 0.05 to 0.5 mm.

The synthetic resin sheet (2) is made of one used for a conventional extrusion molding process which is not critical, for example, polyethylene, polypropylene, polybutene, polyvinyl chloride, polystyrene, polyamide and polycarbonate. In view of extrusion moldability, it is preferable to use a polyolefin type synthetic resin such as polyethylene, polypropylene and polybutene. The thickness of the synthetic resin sheet (2) is not critical and is selected depending upon the thickness of the laminated plate and is usually in a range of 0.3 to 10 mm.

The metallic sheet (1), (1') is taken out under stretching condition at a constant tension, from uncoilers (3), (3') by take-up rolls (4), (4'). The tension applied to the metallic sheets (1), (1') can be varied as desired by controlling braking force for the uncoilers (3), (3') and is usually controlled to a constant tension in a range of 0.2 to 1.5 kg/mm$^2$.

The stretched metallic sheets (1), (1') are firstly fed into surface treating steps (5), (5') to perform the desired surface treatment such as deoiling, water washing, and drying by the conventional methods. Then, the metallic sheets (1), (1') are preheated in the preheating steps (6), (6'). The temperature in the preheating is a temperature near the temperature of the heat-press roll (8), (8'). The preheated metallic sheets (1), (1') are fed together with the molten synthetic resin sheet (2) extruded from an extruder (7), between heat-press rolls (8), (8') in the laminating step to perform the lamination. When the temperature of the synthetic resin sheet (2) is too low, the adhesion to the metallic sheet may not be satisfactorily attained. The temperature should be decided depending upon wettability of the resin to the metal. In the case of the use of a polyolefin type synthetic resin, it is selected from a range of about 180° to 240° C. The temperature of the heat-press rolls (8), (8') is depending upon a kind of the synthetic resin and a feeding speed of the metallic sheets (1), (1') and is not critical. In the case of the use of a polyolefin type synthetic resin, the temperature on the surface of the roll is in a range of about 180° to 230° C.

The laminated plate fed out through a gap between the heat-press rolls (8), (8') is, if necessary, heat-aged in a heating step (9). The heat-aging is effective in the case of the use of a binder for laminating the metallic sheets and the synthetic resin sheet. Thus, the heat-aging mainly imparts aging effect in a chemical reaction of the binder.

The process of the present invention is characterized by feeding the laminated plate formed in the laminating step into the special bending step.

In the bending step, a plurality of rolls (11), (11') . . . are arranged in zig-zag positions. The rolls preferably have each diameter ranging from 50 mm to 200 mm.

The rolls usually arranged to give each distance between shafts of adjacent rolls in a range of 0.5 to 2 d to a diameter of the roll (d). The rolls are arranged as shown in FIG. 2 to slightly intervene each other in vertical direction, thereby bending the laminated plate passing between the rolls in a degree less than the bending elastic limit. The slight interposing of the rolls is decided by the method of measuring the bending elastic limits of the laminated plate in cold in the practical process under various depths in the interposing. For example, in the case of the laminated plate made by laminating aluminum sheets having a thickness of 0.2 mm on both surfaces of a polyethylene sheet having a thickness of 1.6 mm, the depth of the interposing (l) shown in FIG. 2 is selected from the range of about 1 to 10 mm.

In the process of the present invention, it is important to cool the laminated plate to fall the temperature of the synthetic resin to be a softening point or lower on the rolls (11), (11') . . . in the bending step. The cooling of the laminated plate is performed in the cooling step using a cooling chamber (10) placed front of the first roll (11) in the bending step and a blower placed to face the group of the rolls. The cooling chamber (10) is used for pre-cooling the laminated plate passing through the chamber. The cooling is performed by air fed into the cooling chamber (10) by a blower (not shown). The cooling air blower (12) is used for falling the temperature of the synthetic resin in the laminated plate to a softening point or lower on the rolls (11), (11') . . . . An air distributing pipe (not shown) having a length for a width of the laminated plate is connected at the outlet of the blower. It is possible to pass a coolant water through the rolls (11), (11') . . . .

In the practical control of the temperature in the cooling step, the temperature of the metallic sheet at a softening point or lower of the synthetic resin is previously measured and, the control is performed depending upon the indication of the temperature of the metallic sheet. For example, in the case of the aluminum-low density polyethylene laminated plate having the aforementioned structure, the condition in the cooling step of the present invention can be provided by cooling it to give the temperature of the aluminum sheet surface at about 90° to 110° C. on the rolls near the inlet of the bending step and at about 60° to 90° C. on the rolls near the outlet of the bending step.

The softening point of the synthetic resin is measured by ASTM D-155. The softening point of low density polyethylene is about 99° C.

In accordance with the process of the present invention, the formation of the longitudinal wave on the metallic surface can be substantially prevented to prepare the laminated plate having excellent appearance, though it has been considered to be difficult.

BRIEF DESCRIPTION OF THE DRAWINGS

FIG. 3 (a) is for the laminated plate prepared by the process of the present invention and FIG. 3 (b) is for the laminated plate prepared by the process of the reference:
(1), (1'): metallic sheets;
(2): thermoplastic synthetic resin sheet;
(3), (3'): uncoiler;
(4), (4'): take-up rolls;
(8), (8'): heat-press rolls;
(11), (11'): group of rolls in bending step;
(12) cooling air blower.

BEST MODE FOR CARRYING OUT THE INVENTION

The present invention will be further illustrated by examples.

EXAMPLE

Figure 1:
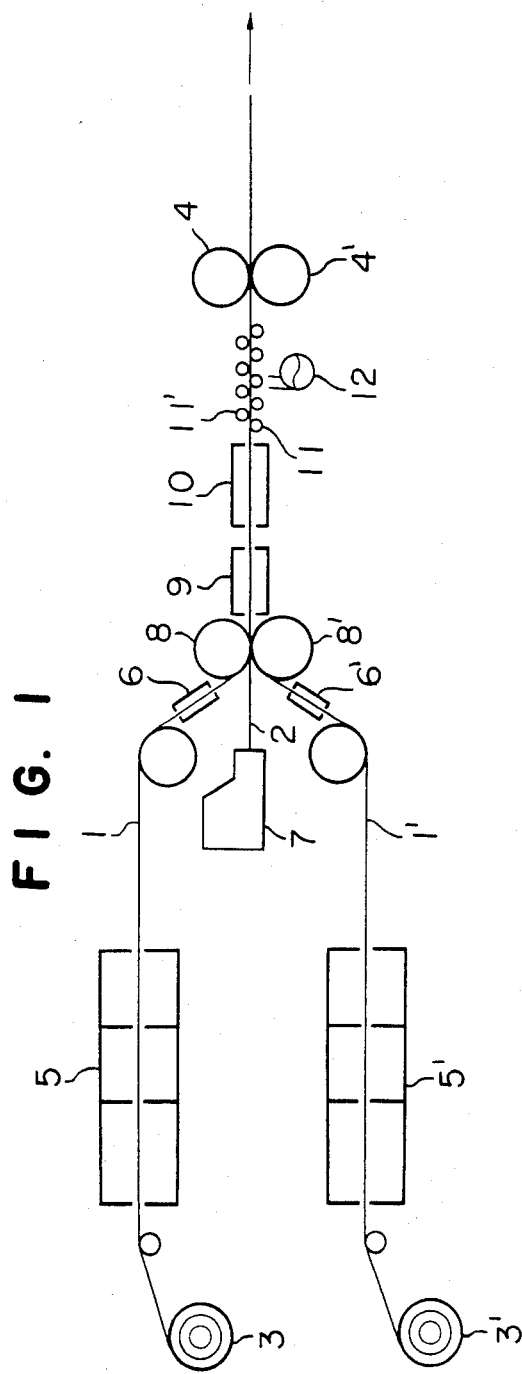
FIG. 1 is a schematic side view showing one embodiment of the process of the present invention.
Figure 2:
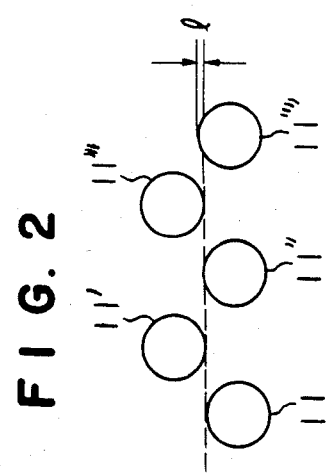
FIG. 2 is a schematic side view showing arrangement of rolls in a bending step.

A laminated plate having laminated aluminum sheets having a thickness of 0.15 mm on both surfaces of a low density polyethylene sheet having a thickness of 1.7 mm was continuously prepared by an apparatus shown in FIG. 1.

A blend of a commercially available binder and polyethylene (softening point of about 99° C.) was extruded by an extruder (2) at a rate of 470 kg/hr in a form of a sheet having a thickness of 1.7 mm and a width of 1,000 mm. The temperature of the sheet was about 220° C. Aluminum sheets having a thickness of 0.15 mm were taken out from uncoilers (3), (3') by the take-up rolls (4), (4'). The tension applied to the aluminum sheet was about 0.8 kg/mm$^2$.

The aluminum sheets were deoiled, water-washed, chemically treated and dried by the conventional processes in the surface treating step (5).

The surface-treated aluminum sheets were passed through the pre-heating step (6), (6') to pre-heat them at about 200° C. and then, were fed together with the polyethylene sheet extruded from the extruder (2) between the heat-press rolls (8), (8') to laminate them. The temperature of the heat-press rolls was about 210° C. The laminated plate fed out of the heat-press rolls was passed through the cooling chamber (10) to pre-cool it to give the temperature of the aluminum sheet surface at about 105° C.

The pre-cooled laminated plate was fed among the rolls (11), (11') . . . in the bending step to cool it by the cooling air blower (12). The temperature of the aluminum sheet surface of the laminated plate was at about 105° C. at the position of the inlet rolls and about 85° C. at the position of the outlet rolls.

Figure 3A:
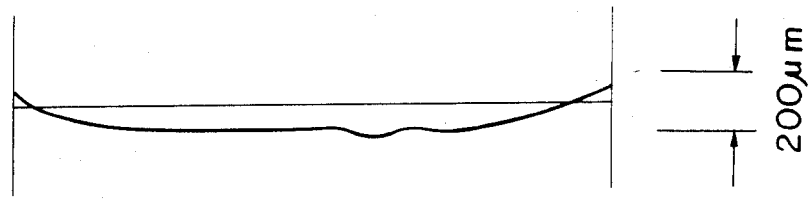
FIGS. 3 (a), (b) are graphs showing surface conditions of the laminated plates.
Figure 3B:
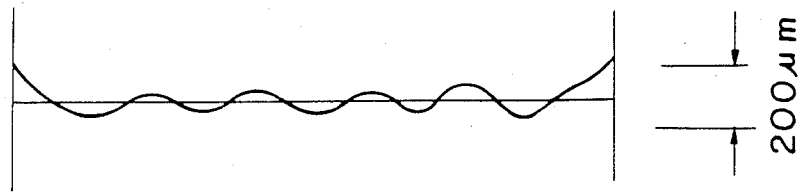

The size and arrangement of the rolls in the bending step are as follows:
Number of rolls: 11 rolls
Diameter of rolls: 100 mm
Distance between shafts of rolls: 65 mm
Depth of interposing of rolls: 3 mm The formation of longitudinal wave of the laminated plate was measured by a longitudinal wave tester equipped with a differential transformer. The result is shown in the graph of FIG. 3 (a).

As a reference, a laminated plate was prepared by the same process without using the group of the rolls in the bending step.

The formation of longititunal wave of the laminated plate was measured. The result is shown in the graph of FIG. 3 (b).

The longitudinal wave tester is, in principal, a tester in which a roll is freely beared on one end of a variable spindle of the differential transformer and a fixed roll is placed to face the freely beared roll and a platy specimen is passed between the rolls to record vertical movement of the variable spindle corresponding to the unevenness of the surface of the specimen.

In the example, the platy specimen cut in a desired size was passed between the rolls in the transverse direction (perpendicular to the take-up direction in the process line) to measure the unevenness of the surface (longitudinal wave formed in the take-up direction in the process line). FIGS. 3 (a), (b) show the surface conditions observed in the direction of take-up of the laminated plate. In FIGS. 3 (a), (b), the axis of ordinate is enlarged at a magnitude of 500 times to the axis of abscissas.

As is shown in FIGS. 3 (a), (b) four longitudinal waves were formed on the laminated plate surface in the reference in which the bending step was not included, whereas no longitudinal wave was formed in the process of the present invention.

INDUSTRIAL APPLICABILITY

The process of the present invention is especially useful as a process for preparing a laminated plate having excellent appearance.

We claim:

1. A process for preparing a laminated plate by laminating metallic sheets on both surfaces of a thermoplastic synthetic resin sheet which comprises
   (a) preheating two metallic sheets stretched under a constant tension;
   (b) feeding said preheated metallic sheets and said synthetic resin sheet in a molten state to place said synthetic resin sheet between said metallic sheets, between heat-press rolls;
   (c) passing said laminated plate among a plurality of rolls arranged in zig-zag positions to form curves of said laminated plate in a degree less than its bending elastic limit; and
   (d) cooling said laminated plate to a temperature of said synthetic resin to be at the softening point or lower on the rolls in step (c).

2. The process for preparing a laminated plate according to claim 1 wherein a cooling air blower which is placed to face the rolls in step (c) is used in the cooling step.

3. The process for preparing a laminated plate according to claim 1, or 2, wherein said rolls used in the bending step have a diameter ranging from 50 to 200 mm.

4. The process for preparing a laminated plate according to claim 1, wherein a distance between shafts of adjacent rolls in the bending step is in a range of 0.05 to 2 d to a roll diameter (d).

5. The process for preparing a laminated plate according to claim 1, wherein said thermoplastic synthetic resin sheet is a polyolefin type synthetic resin sheet or polyamide type synthetic resin sheet which has a thickness ranging from 0.3 to 10 mm.

6. The process for preparing a laminated plate according to claim 1, wherein said metallic sheet is an aluminum sheet, a steel sheet or a stainless steel sheet which has a thickness ranging from 0.05 to 0.05 mm.

* * * * *